United States Patent [19]

Kern et al.

[11] Patent Number: 4,959,852
[45] Date of Patent: Sep. 25, 1990

[54] TELEPHONE ANSWERING MACHINE HAVING SOLID STATE AND MAGNETIC TAPE STORAGE FOR OUTGOING ANNOUNCEMENTS

[75] Inventors: Ronald J. Kern; Alan D. Michel, both of Noblesville; William V. Powell, Jr., Indianapolis, all of Ind.

[73] Assignee: AT&T Information Systems Inc., Morristown, N.J.

[21] Appl. No.: 110,243

[22] Filed: Oct. 19, 1987

[51] Int. Cl.⁵ .............................................. H04M 1/65
[52] U.S. Cl. ........................................ 379/70; 379/88
[58] Field of Search ................ 379/68, 70, 79, 88, 379/89; 381/51–53, 36–40; 364/513.5; 375/30

[56] References Cited

U.S. PATENT DOCUMENTS

| Re. 31,720 | 10/1984 | DeFreitas et al. | 375/30 |
| 2,927,962 | 3/1960 | Cutler | 375/30 |
| 3,550,004 | 12/1970 | Candy | 375/30 |
| 3,646,442 | 2/1972 | Kotch | 375/30 |
| 3,735,264 | 5/1973 | Mauduech | 375/30 |
| 3,754,234 | 8/1973 | Laane et al. | 375/30 |
| 3,835,385 | 9/1974 | Hoeschele, Jr. et al. | 375/30 |
| 3,903,369 | 9/1975 | Darwood | 179/6 |
| 3,995,218 | 11/1976 | Moriya et al. | 375/30 |
| 4,359,607 | 11/1982 | Hannig et al. | 379/70 |
| 4,581,485 | 4/1986 | Bond et al. | 179/6.13 |
| 4,672,659 | 6/1987 | Hanscom et al. | 379/79 |

OTHER PUBLICATIONS

*Digital Coding of Waveforms*, pp. 408–415, Prentice-Hall, Inc. 1984, N. S. Jayant and Peter Noll.

Primary Examiner—Alan Faber
Assistant Examiner—James E. Tomassini

[57] ABSTRACT

A telephone answering machine having solid state storage of an outgoing announcement (OGA) is improved by magnetic tape apparatus 120 for providing backup protection of the OGA in the event of a power failure. Also stored on the magnetic tape is the time duration of the OGA. Analog to digital conversion of the OGA, for storage in Dynamic Random Access Memories 210, 220 and 230, proceeds at a sampling rate that is inversely proportional to the time duration of the OGA to assure that the available memory space is fully utilized.

16 Claims, 5 Drawing Sheets

TELEPHONE ANSWERING MACHINE HAVING SOLID STATE AND MAGNETIC TAPE STORAGE FOR OUTGOING ANNOUNCEMENTS

Technical Field

This invention relates to telephone answering machines having solid state storage of announcement messages and more particularly to the joint use of a magnetic tape in the storage of announcement messages.

BACKGROUND OF THE INVENTION

Telephone answering machines generally require two magnetic tapes. Upon activation by an incoming call, an announcement, recorded on a first tape (T-1), is transmitted over the telephone line to the calling party. A second tape (T-2) is activated after the announcement has been completed and is used for recording and storing incoming messages. Announcement tape (T-1) is typically an "endless" tape that stores one or more pre-recorded announcements. In an effort to minimize cost and space, many answering machine manufacturers have eliminated the announcement tape in its entirety and now use a single tape to deliver an outgoing announcement and to record incoming messages. The single magnetic tape is partitioned to store announcements in one region, message address data in another, and incoming messages in yet another region. During operation, however, the tape must move from one region to another in order to deliver the announcement and then position itself to record the incoming message. Even with fast-forward capability it frequently takes an undesirable amount of time to move from one region of the tape to another.

Use or a solid state storage apparatus to deliver the outgoing announcement has, for the most part, solved the time delay problem. The solid state storage apparatus is preferably a Random Access Memory (RAM) that stores a large number of binary digits. These digits are extracted from the RAM in a predetermined sequence and converted into a time varying electrical signal which comprises the outgoing announcement formerly stored on announcement tape (T-1). The technique of storing and delivering pre-recorded announcements using solid state storage apparatus is sometimes referred to as "voice synthesis." While this technique is useful, it is not without problems. In the event or a power outage, loss of information stored in the RAM is possible unless a more "nonvolatile" device, such as an EPROM, is used. Alternatively, battery backup may be provided to safeguard the stored information; but batteries have a limited life, increase the cost and size of the telephone answering machine, and impose the burden of purchasing and installing batteries.

Additionally, the quality of speech available using solid state storage apparatus is proportional to the number or binary digits used to encode the speech. High quality speech, therefore, requires a large memory space—much of which is wasted to assure that a sufficient amount will be available for the longest outgoing announcement.

It is therefore an object of the present invention to provide a telephone answering machine with solid state storage apparatus to deliver outgoing announcements and thereby minimize the time delay between the end of the announcement and the time when a caller can enter his/her message.

It is another object of the invention to safeguard the information stored in the solid state storage apparatus during a power failure in a cost effective manner, and without the disadvantages associated with a battery.

It is yet another object of the invention to provide optimum speech quality for announcements of different length.

SUMMARY OF THE INVENTION

The present telephone answering machine is characterized by a magnetic tape for storing incoming messages and one or more outgoing announcements. The answering machine further includes solid state storage apparatus and means for preparing and transferring announcements from the magnetic tape to the solid state storage apparatus. Commands for carrying out the transfer of announcements and other operations are stored in permanent memory while the solid state storage apparatus, used for outgoing announcement storage, comprises non-permanent (i.e., volatile) memory.

Outgoing announcements are stored on the magnetic tape along with information that includes the time duration of the announcement. Analog-to-digital conversion is performed on the stored outgoing announcement. In a preferred embodiment of the invention Continuously Variable Slope Delta Modulation (CVSD) is used to convert the announcement signals into a sequence of binary digits suitable for storage in the solid state storage apparatus—preferably a Dynamic Random Access Memory (DRAM). One of eight possible sampling frequencies is selected for use in the conversion process in accordance with the duration of the outgoing announcement and the amount of DRAM available to store the individual samples. As the time duration of the outgoing announcement decreases, the sampling frequency increases to thus maintain full utilization of the available memory space in the DRAM. Naturally, speech quality improves as the sampling frequency increases.

In the event of a power loss, permanently stored instructions cause the magnetic tape to automatically rewind to its beginning when power is reapplied. During the rewind process, a counter measures the distance traveled to the beginning of the tape and hence "learns" the location of the end of the message region so that the tape can be returned to that location after a power-up sequence is completed. The power-up sequence includes the step of transferring the stored outgoing announcement from the magnetic tape to the DRAM so that when the next call is received, the answering machine is fully operational and the tape is positioned to immediately record a message.

The present invention will be more fully understood when reference is made to the following detailed description in conjunction with the accompanying drawings.

DETAILED DESCRIPTION

Figure 1:
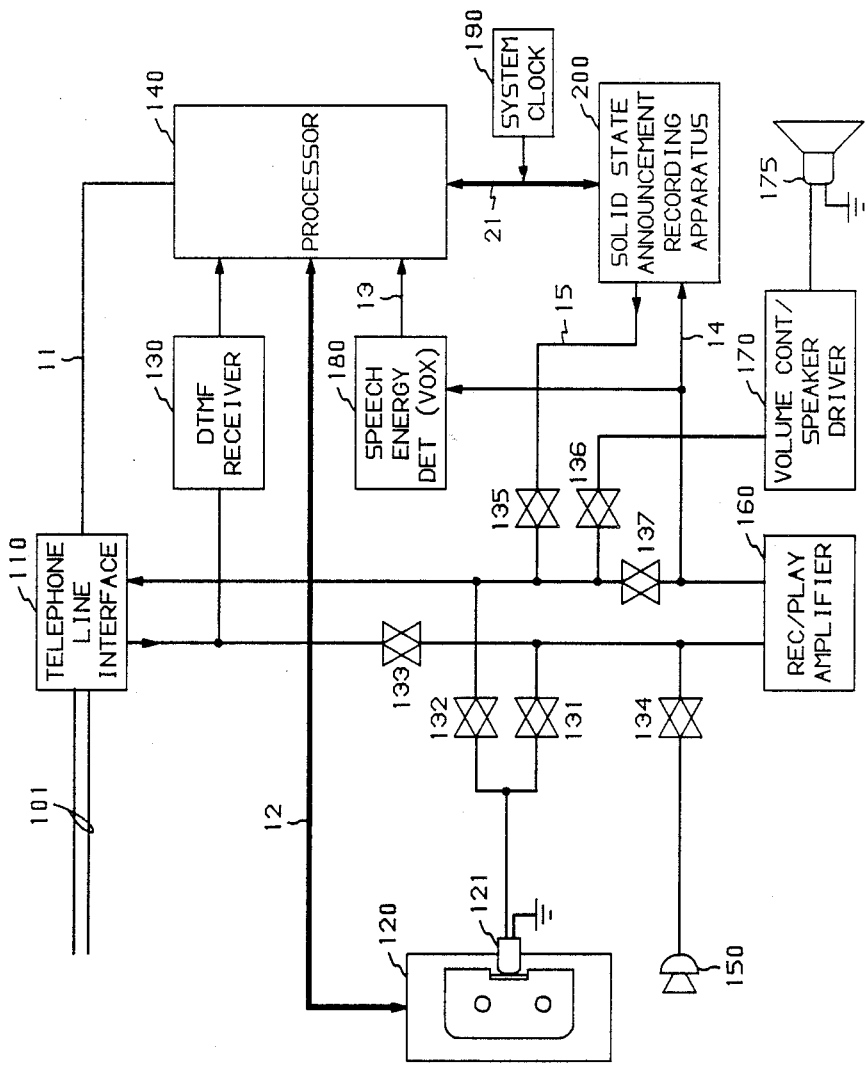
FIG. 1 is a system block diagram of an announcement storage system for telephone answering machines in accordance with the invention.

Central to the telephone answering machine is processor 140, shown in FIG. 1, that controls virtually all operations of the answering machine in accordance with a program permanently stored in its associated memory. Indeed, practically all modern electronic equipment includes special purpose hardware controlled by software—a microprocessor being the interface between the software and the special purpose hardware. In this respect, the present invention is no exception. Processor 140 is responsive to user operated switches, signals from various independent circuits, and a stored program to control a tape deck, microphone and interconnections between various circuits and telephone line 101. A suitable processor is the NEC 75308 4-bit microprocessor.

FIG. 1 is a block diagram of the subject telephone answering machine illustrating the major operations that are performed in accordance with the invention. Telephone line interface 110 connects to telephone line 101 and includes circuitry to terminate the telephone line, detect ringing, and monitor the switchhook status. Control lines 11 convey the above information between line interface 110 and processor 140. During automatic answer operation, ringing is detected within interface 110 and delivered to processor 140 which answers the call by activating a contact within interface 110 thereby causing sufficient DC current flow between the wires of telephone line 101 to "answer" the call. Thereafter, processor 140 causes solid state announcement recording apparatus 200 to transmit a stored announcement. Analog switch 135 is operated by processor 140 and the announcement message is connected to line interface 110. When the announcement is complete, tape deck 120, positioned to accept the next incoming message, is activated to record an incoming message. At this time, switches 133 137 and 132 are energized by processor 140 to provide an electrical path between telephone interface 110 and tape deck 120. Switch 136, speaker 175 and driver 170 allow monitoring or the incoming call. Additionally, speech energy from the telephone line is connected through record/play amplifier 160 to speech energy detector (VOX) 180 to detect the presence of an incoming message to tape deck 120. VOX circuit 180 provides an affirmative indication to processor 140 over lead 13 when speech energy is present. In response, processor 140 causes tape deck 120 to keep recording until it is determined that speech is no longer present.

Processor 140 controls the operation of tape deck 120 over leads 12. Control signals that pass over these leads include power, fast forward, play, reverse, and solenoid control of read/write head 121. The tape deck generates a pre-determined number of pulses for each revolution of the tape drive mechanism and delivers these pulses to processor 140 over leads 12 so that locations or the various recorded announcements and messages on the magnetic tape can be identified and thereafter retrieved by the processor.

Figure 4:
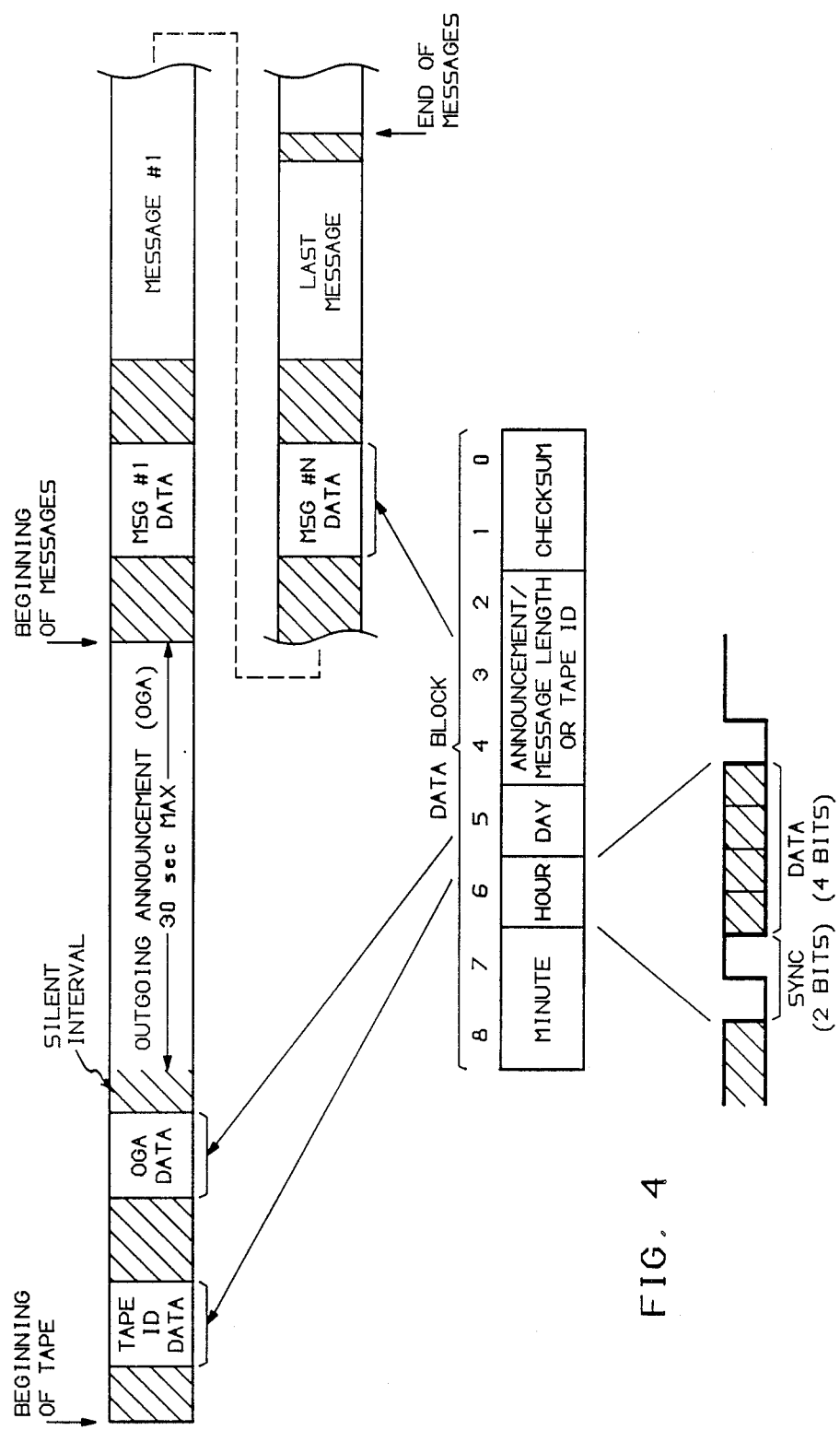
FIG. 4 illustrates the organization of information stored on the magnetic tape.

The magnetic tape is organized in accordance with FIG. 4 with the outgoing announcement stored at the beginning of the tape. Althouqh announcements are delivered by solid state recording apparatus 200, the importance of also storing the same announcement on magnetic tape is apparent. Magnetic tape offers a permanent storage for such announcements and does not require electrical power to sustain its memory. Therefore, inexpensive DRAM devices can be used to implement the solid state announcement recording apparatus (200) without the need for a battery to back up the memory in the event of a power failure.

Returning to FIG. 1, the announcement is initially loaded onto the magnetic tape by a user who activates a "record" switch and speaks into microphone 150. Processor 140 operates switch 134 to thereby connect microphone 150 to record/play amplifier 160 which connects the output signal of the microphone to read/write head 121 of the magnetic tape drive through switches 137 and 132 which are also activated by processor 140 at this time. The output signal from microphone 150 is also presented to VOX circuit 180. Completion of the recording of the announcement message is indicated either by silence detected in the VOX circuit, operation of a "stop" switch on the face or the telephone answering machine, or the lapse of a maximum time interval (approximately 30 seconds). During the recording of the outgoing announcement, processor 140 calculates the time duration of same. This information is thereafter used to optimize the sound quality of the outgoing announcement that is transferred from the magnetic tape to solid state announcement recording apparatus 200.

Processor 140 causes magnetic tape deck 120 to rewind to the beginning of the announcement and commence playback so that the announcement stored on tape can be recorded in solid state recording apparatus 200. The announcement is played back through the record/play amplifier 160 and connected to solid state recording apparatus 200 over line 14. So that the quality of the announcement can be monitored at this time, the output of the apparatus 200 is routed to loudspeaker 175 through switches 135, 136 and speaker driver 170. It is noted that switches 131-137 are commercially available analog switches such as the 4066-type. Each includes an input control lead (not shown) connected to processor 140 for the purpose of activating the switch.

In a preferred embodiment of the invention, processor 140 regulates the rate at which the announcement message is sampled and converted into binary digits for storage in apparatus 200. Since there is dedicated storage for the announcement, it makes sense to use the entire capacity for all announcements. The longest announcements (approximately 30 seconds) are of adequate speech quality, while shorter announcements achieve higher quality through an increase in sampling rate. Thus, sampling rate is inversely proportional to the measured duration of the announcement. The operation or solid state announcement recording apparatus 200 is hereinafter explored.

Figure 2:
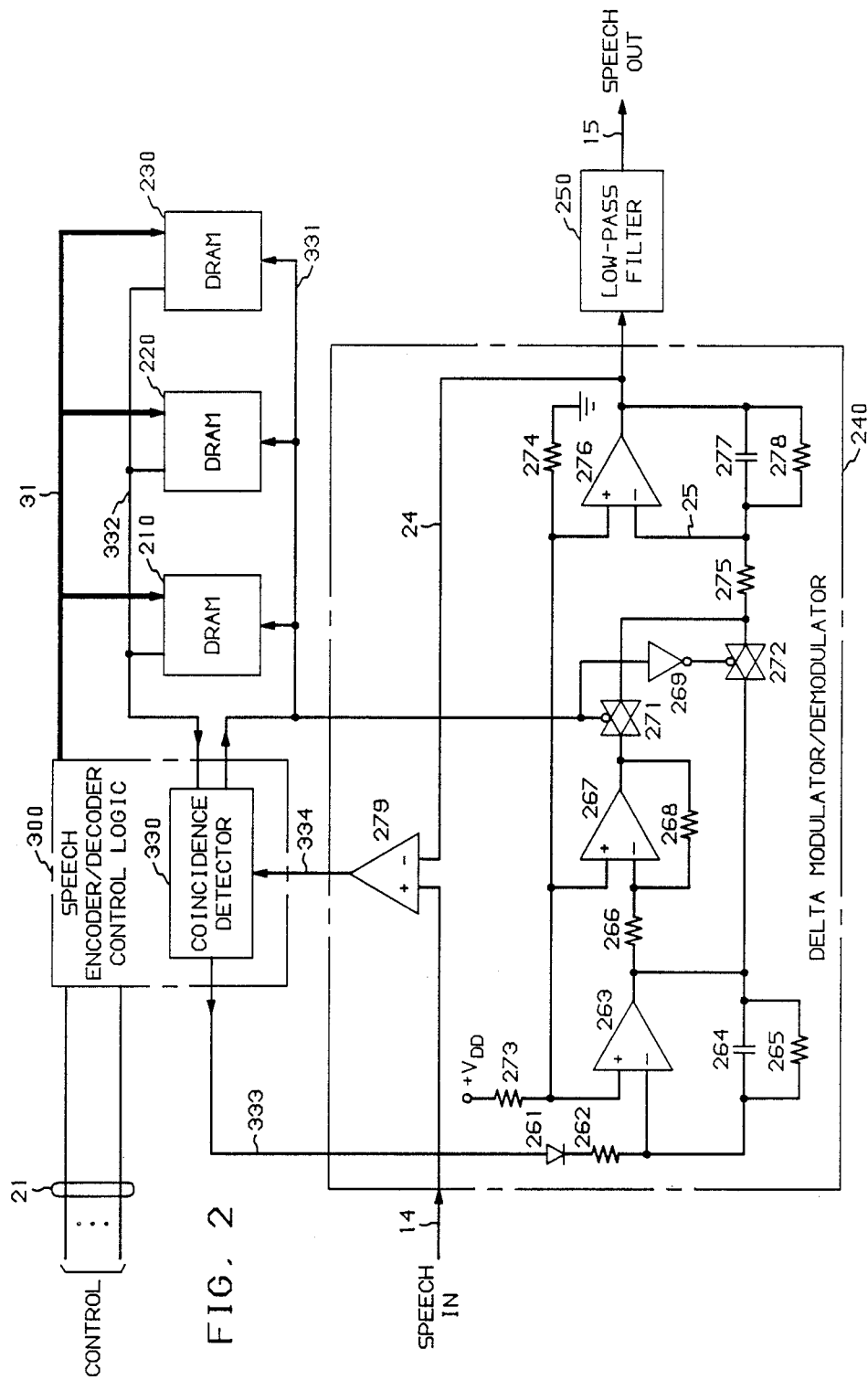
FIG. 2 is a block diagram of the solid state announcement recording circuit used in the present invention.

FIG. 2 discloses a more detailed description of solid state announcement recording apparatus 200. Speech encoder/decoder control logic 300 operates to convert an analog speech signal into a digital speech signal suitable for storage in random access memory. In the present invention, the outgoing announcement is stored in DRAM 210, 220, and 230. Suitable devices include the 41256 DRAM, available from a number of manufacturers, each capable of storing 256 kilobits of binary data. The operation of speech encoder/decoder 300 is disclosed in even greater detail in FIG. 3. First, however, the particular analog to digital conversion system used in the present invention is disclosed.

Analog to digital converters are well known and extensively used in connection with the transmission of speech signals. Pulse Code Modulation (PCM) is perhaps the most widely used technique on digital transmission facilities and generally transmits a "word" comprising a group of 7 or 8 binary digits to represent each sample or a time varying electrical signal. An important class of converters, known as Delta Modulators, eliminates the need for word framing at a transmitter and receiver by transmitting a one-bit codeword. For example, at each sampling instant, if the electrical signal is more positive than an estimate or reconstruction of the electrical signal, based on previous digits, a logic ONE is transmitted; otherwise a logic ZERO is transmitted.

A fundamental consideration in the design of Delta Modulators is the selection of step size, that is, the magnitude by which a reconstructed signal is incremented/decremented by each received binary digit. It is, therefore, useful to know the slope statistics of the time varying electrical signal to avoid "slope overload" when the step size is too small, or "granularity" when the step size is too large. Naturally, an optimum step size exists for a particular waveform, but it may be incorrect for others.

Adaptive schemes exist whereby the step size changes in accordance with a predetermined algorithm. Adaptation at a slowly varying rate, say at a syllabic rate, has been shown to be appropriate for speech waveforms. In a preferred embodiment of the invention Continuously Variable Slope Delta Modulation (CVSD) is employed. CVSD is a syllabic algorithm with step-size changes that are based on observation times shorter than in continuous Delta Modulation and is discussed in greater detail at pp. 408-415 of the textbook entitled *Digital Coding of Waveforms*, N. S. Jayant and Peter Noll, Prentice-Hall, Inc. 1984. A block diagram of a basic acaptive Delta Modulation system is shown in FIG. 8.18 of the above-identified textbook. In this diagram, periodic samples X(n) of the time varying electrical signal are compared with a digitally reconstructed signal from a "predictor" circuit. The results of that comparison are delivered to a 1-bit quantizer used to select the polarity of the next step to be added to the digitally reconstructed signal. Logic, or other circuitry is provided to regulate the step size. FIG. 8.25 of the above-identified text focuses on an implementation of a CVSD algorithm such as used in the present invention.

The particular technique selected in the present invention is described using a (J,K,L) model, discussed in the above textbook, which requires that the step size be increased for L samples whenever K of the last J bits are equal in sign. In the present invention, J=K=4, and L=1; and the maximum step size is approximately 30 units. Further, if 4 of the last 4 bits are not equal in sign, then the step size is decreased gradually to a minimum of 1 unit. For example, if the time varying electrical signal increases faster than the digitally reconstructed signal from the predictor circuit in a particular direction (positive or negative) for 4 consecutive samples, then the step size is increased to 2 units, then 3 units etc. up to a maximum of 30 units. The step size is always increasing or decreasing until an upper limit (power supply voltage) or a lower limit is reached.

Comparator 2/9 of Delta Modulator/Demodulator 240 compares input speech signals on lead 14 with an approximation signal on lead 24. The result of this comparison is delivered to coincidence detector 330 over lead 334. The coincidence detector includes circuitry that compares the last 4 bits out of comparator 279 and provides a logic ONE output on lead 333 when the 4 bits are all ONE or all ZERO. The output signal on lead 333 is processed by a first integrator circuit comprising components 261–265. The first integrator stores the magnitude of the step and increases it in response to a ONE on lead 333 or decreases it in response at a ZERO on lead 333. Diode 261 is selected for its impedance characteristic in connection with the rates of increase and decrease (time constants) of the integrator. Resistors 273, 274 provide a reference voltage used by operational amplifiers 263, 267 and 276 whose magnitude is substantially half of the supply voltage $V_{DD}$. Operational amplifier 267 provides inversion of the output of operational amplifier 263, and analog switches 271, 272 operate to select the polarity of the next step added to the approximation signal stored in a second integrator circuit comprising components 275–278. The second integrator stores the approximation signal and increases/decreases its magnitude in accordance with the magnitude and polarity of the added step. This step is delivered to input lead 25 of the second integrator through resistor 275. The digitally reconstructed signal is itself available on lead 24 where it is filtered via low pass filter 250 to provide a speech output signal on lead 15. Low pass filter 250 is a two pole filter having a nominal bandwidth of 4 kHz. The digitally reconstructed signal is delivered to comparator 279 for comparison with the level of the input speech signal. The result of that comparison is a binary data signal that is delivered to coincidence detector 330 on lead 334 and used as raw data for determining step size. The same binary data signal is re-timed by coincidence detector 330 and delivered, over lead 331, to: (i) switches 271, 272 to select the polarity or the next step added to the approximation signal; and (ii) DRAMs 210, 220, 230 to implement storage of an outgoing announcement in solid state memory.

During playback of the OGA, stored in DRAMs 210, 220 and 230, lead 332 carries the stored binary digital signal into coincidence detector 330 where a decoding process commences. This decoding process is merely a repeat of the coding process performed by Delta Modulator/Demodulator 240. This time, however, it is performed to utilize the approximation signal available on lead 24 rather than the binary digits available on lead 334. Coincidence detector 330 includes a 4-bit shift register and logic circuitry to search for 4 consecutive binary digits of the same state on input lead 332. In response, a logic ONE is presented on output lead 333; otherwise, a logic ZERO is presented. Such signals on lead 333 are used to increase or decrease the magnitude of the step size by which the approximation signal is incremented at each sample time. The binary digits on lead 332 are retimed by coincidence detector 330 and presented on output lead 331 to control the polarity (via switches 271, 272) of the steps added to the approximation signal at each sample time. As shown in FIG. 1, the solid state stored OGA, available on lead 15, is connected to telephone wire-pair 101 through analog switch 135 and telephone line interface 110. It is noted that since Delta Modulator/Demodulator 240 is used for both the coding process and the decoding process. Accordingly, the "speech out" signal on lead 15 is an extremely accurate replication of the "speech in" signal on lead 14.

Figure 3:
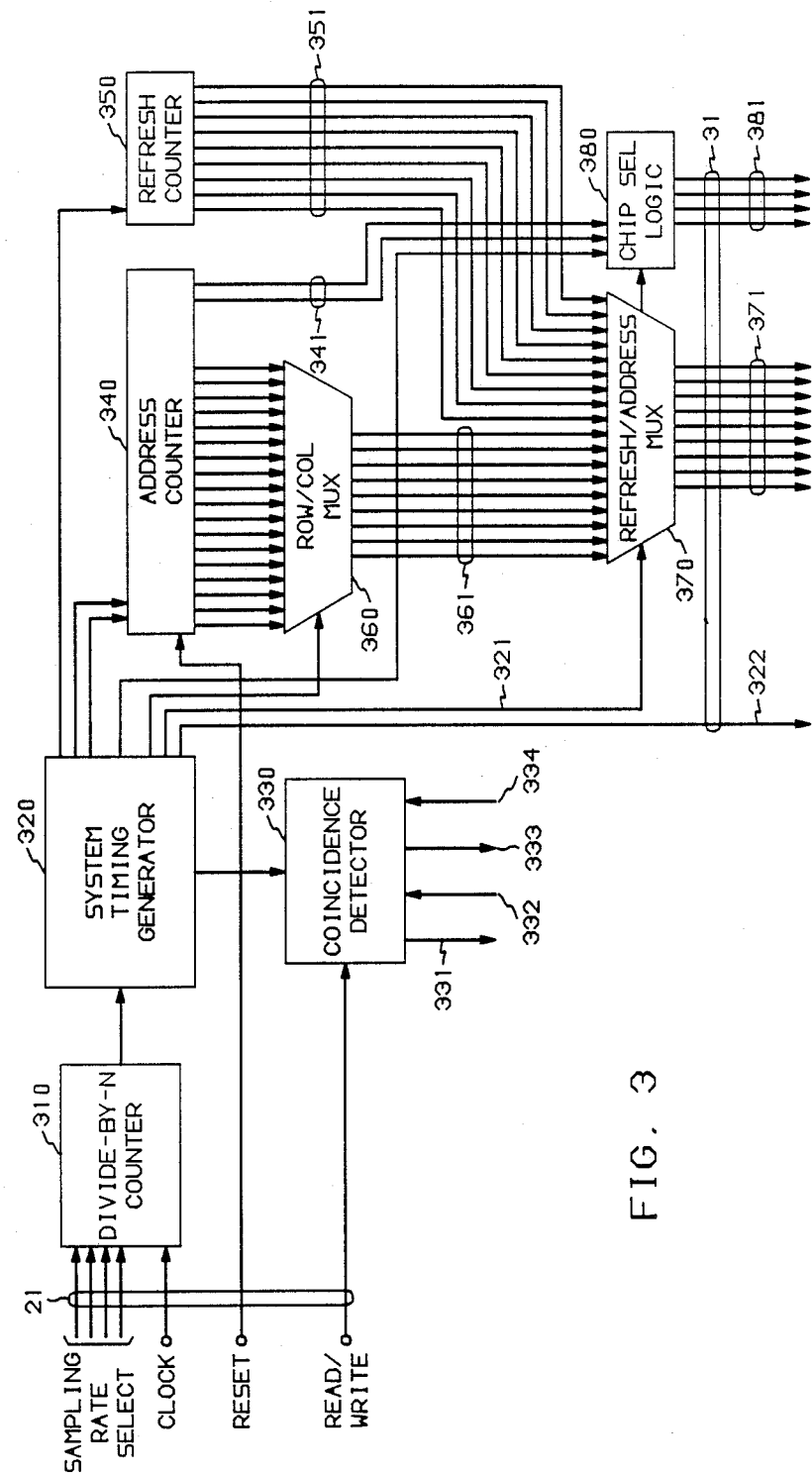
FIG. 3 is a block diagram of the speech encoder/decoder control logic.

Turning now to FIG. 3, the sampling rate is determined in accordance with the state of the signal designated "sampling rate select" on leads 21. Divideby-N counter 310 functions to decrease the frequency of a clock signal on leads 21 whose basic frequency is 3.5/9 MHz - the frequency of a conventional color burst crystal. This frequency is first divided by 16 and then divided by N+1 where N varies from a minimum of 1 to a maximum of 15. The resulting sampling frequencies vary from 112 kb/s to 25 kb/s. The memory capacity of the three DRAMs is approximately 786,000 bits and thus stores a minimum of 7 seconds of recorded speech at the fastest sampling rate or a maximum of approximately 30 seconds of recorded speech at the slowest sampling rate. Accordingly, each unit increase in the value of N adds 3.5 seconds of speech starting at 7 seconds for N=1. Thus, once the desired length of message is known, the value or N is selected by processor 140 to accommodate the desired length of message in the available memory space. System timing generator 320 responds to the sampling signal from counter 310 to distribute timing signals to the various using components. Address counter 340 determines the next address to receive a bit from the bit stream during recording, or to determine the next bit to output to the bit stream during playback. This counter also includes means, along with chip select logic, to determine when all available memory has been used and the recording or playback of the announcement is completed. Row/column multiplexer 360 selects a first portion of an address during a first time slot and a second portion of an address during a second time slot. It alternately delivers these portions, over lines 361, to refresh/address multiplexer 370. Refresh counter 350 is used to maintain the bit stream in the DRAM when it is not actively being accessed. Row/column multiplexer 360 multiplexes the current address in the form required by the DRAM being used with the system. In a similar manner, refresh/address multiplexer 370 selects between requested addresses and refresh addresses to allow interleaving of refresh cycles between memory access cycles. Chip select logic 380 is used to allow various quantities of memory to be used, either as separate memory chips such as the 256K bit DRAMs used in the present invention or other types of chips requiring different access schemes. Such address information is all transmitted on bus 31 of which lead 322 is a row/address strobe signal, leads 381 are a column address strobe signals, and leads 371 carry the address of the stored data. The full address on leads 371 is delivered over 2 successive time slots, each time slot delivering one-half or the address. The management of volatile memory is well known in the art of binary data storage, and the particular technique described herein represents standard practice. Of greater significance to the present invention, is the format of the magnetic tape disclosed in FIG. 4.

Magnetic tape used in the present invention is formatted in accordance with FIG. 4. The first block of information placed on the tape is tape identification data which is inserted on the tape after a brief silent interval. Identification data for this particular tape are inserted on the magnetic tape and in the semiconductor memory of the answer and record machine so that when tapes are changed, the address of stored messages are appropriate. Next on the magnetic tape is the outgoing announcement (OGA) data block which includes a measure of the length of the OGA. As stated earlier, the duration of the OGA is used to select the sampling rate and is inversely proportional thereto. It is noted that silent intervals are placed between blocks of information on the tape so that when moving forward or backward to different messages, tape head 121 will be positioned somewhere in the silent interval just prior to the information block being accessed. All data blocks have substantially the same format; the one illustrated in FIG. 4 includes 9 characters - each containing 2 sync bits and 4 data bits. Minute, hour, and day information contained in characters 5-8 represents the point in time when, for example, the outgoing announcement was first recorded. Characters 2-4 contain information such as OGA length, message length or tape ID information, and characters 0-1 are used for error detection to protect the integrity or the data block. Binary data is stored on the tape via amplitude shift keying of a 1400 Hz tone. Returning once again to the format of the tape, subsequent to the OGA data block and associated silent interval, a 30 second time interval is reserved for the storage of the outgoing announcement. Finally, messages are stored on the tape with each message block preceded by data indicating the duration and time of the message. The tape head is normally positioned at the end of message region of the tape so that the recording of the next incoming message can proceed immediately. The use of a solid state stored announcement has eliminated the need to move from place to place on the tape—and the consequent need for callers to wait before delivering their message.

Figure 5:
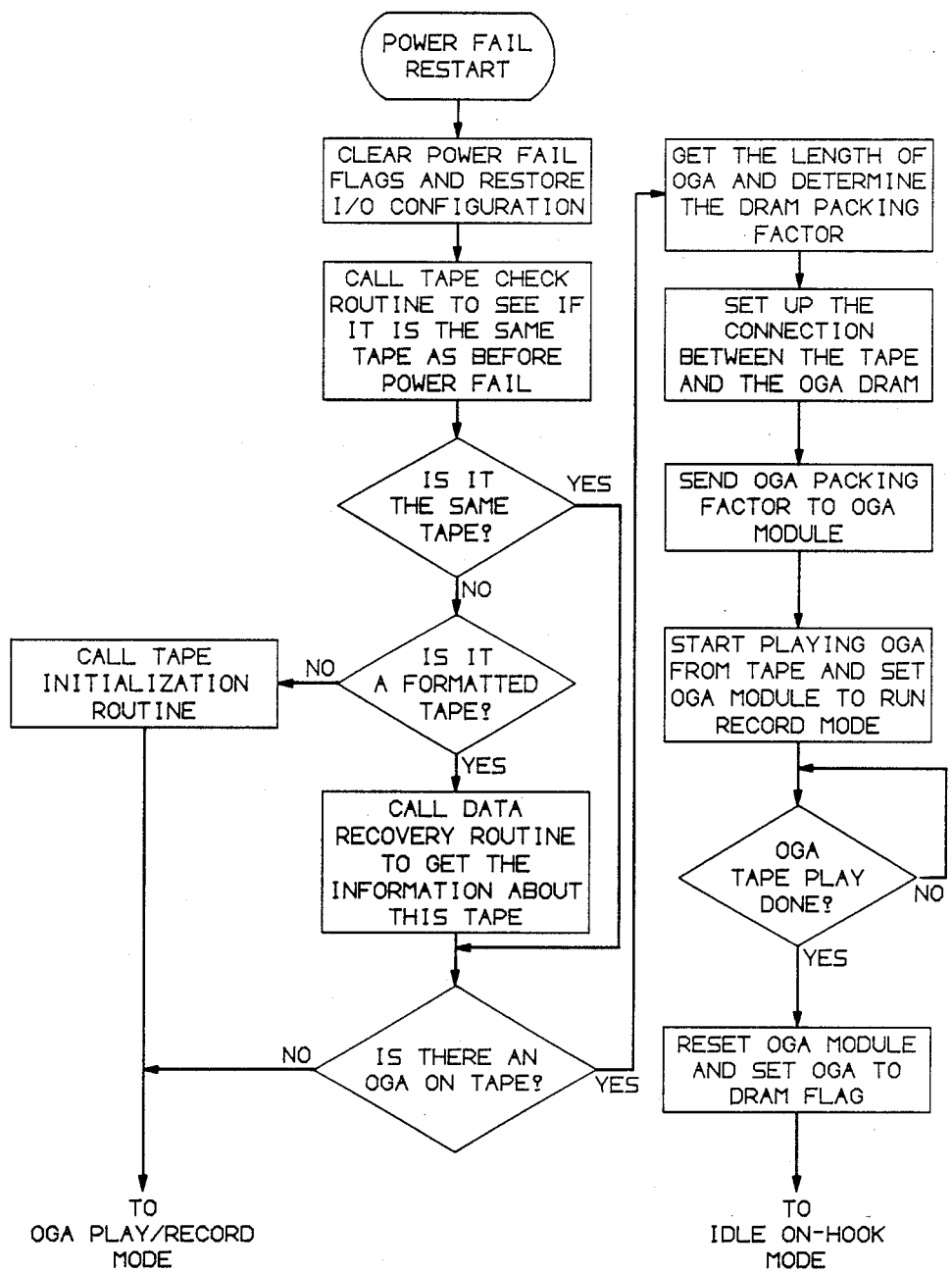
FIG. 5 is a flow diagram that discloses the power fail restart procedure.

FIG. 5 sets forth a method for restarting a telephone answer and record machine in the event of a power failure—after power has been restored. A sequence of commands is stored in permanent memory associated with processor 140. Once the power fail flags have been cleared and the input/output configuration restored, it is necessary to verify that the tape has not been changed during the power failure. If it is not, then the tape must be formatted and a tape initialization routine, also stored in permanent memory, must be initiated. If it is already formatted, then a data recovery routine is invoked to obtain information such as message locations. Assuming that there is an OGA on the tape, it is then necessary to determine its length and then calculate the DRAM packing factor. This amounts to selecting a value for N for use in specifying the sample frequency. If, for example, the OGA length was between 7 and 10.5 seconds, a value of N=2 would be used. For OGAs between 10.5 and 14 seconds in duration, a value of N=3 would be chosen. Analog switch 131 is activated to create a path between tape deck mechanism 120 and solid state announcement recording apparatus 200. This path includes record/play amplifier 160 and lead 14. The OGA signal, stored on the magnetic tape, is converted to a sequence of binary digits for storage in the solid state announcement recording apparatus. Once the OGA is loaded into DRAMs 210, 220, 230, the magnetic tape is advanced to the end of the message region. The converted OGA is monitored via the path comprising switches 135-136, driver 170, and loudspeaker 175.

In one application of the invention, all batteries are eliminated. The start-up routine includes the step of rewinding the tape to its beginning while measuring the rewind distance. The magnitude of this distance is then stored in memory indicating the end of the message region to which the tape will return after the start-up routine is completed. In this particular application, the location of the OGA and the beginning of the message region are fixed.

In another application of the invention, a small battery and/or a large capacitor is used to sustain an otherwise volatile memory circuit that stores a minimal amount of information such as tape ID, message and announcement data blocks, and other critical data. The small battery and/or large capacitor would be incapable of sustaining the OGA memory.

In yet another application of the invention, a plurality of outgoing announcements are stored on magnetic tape. Announcements are selected, as appropriate, for loading into solid state memory. These announcements may vary according to time of day, or season of the year; or in a message forwarding application, the telephone answering machine might be arranged to automatically dial a predetermined number and deliver an announcement followed by a recently received message. The following announcement might, for example, be used: "Hello, an important message for Alan has just been received, please press the pound sign when you are ready to receive it." Since this announcement has been loaded into solid state memory, the tape head can be positioned to deliver the received message immediately upon receipt of the pound sign.

It is understood that various modifications are possible without departing from the spirit and scope of the invention. Such modifications include, but are not limited to, the use of alternate analog-to-digital conversion techniques such as decreasing the number of binary digits used to represent the magnitude of each sample of the announcement signal, stored on the magnetic tape, in inverse proportion to the time duration of the outgoing announcement.

What is claimed is:

1. In a telephone answering machine including a magnetic tape for storing a speech signal for transmission over a telephone line and for recording messages received over the telephone line, characterized by:
    means responsive to the initial recording of the speech signal for storing said speech signal exclusively on said magnetic tape;
    solid state storage means for storing a binary digital signal;
    analog-to-digital conversion means, operative after the completion of said initial recording of said speech signal, for converting said speech signal stored on the magnetic tape into a binary digital signal for storage in the solid state storage means; and
    digital-to-analog conversion means for converting the stored binary digital signal into the speech signal for transmission over the telephone line.

2. The telephone answering machine of claim 1 wherein the solid state storage means is a volatile Random Access Memory.

3. The telephone answering machine of claim 1 further including means for measuring the time duration of the speech signal stored on the magnetic tape, wherein the analog-to-digital conversion means includes:
    means for sampling the speech signal at a variable rate; and
    means responsive to said measured time duration for varying the sampling rate.

4. The telephone answering machine of claim 1 wherein the analog-to-digital conversion means comprises a Delta Modulator, said Delta Modulator including:
    means for storing an approximation voltage, representative of the instantaneous value of the speech signal;
    means for periodically comparing the magnitude of the speech signal with the magnitude of the approximation voltage; and
    means for increasing/decreasing the magnitude of the approximation voltage by a discrete amount in accordance with the outcome of said comparison.

5. The telephone answering machine of claim 4 wherein the Delta Modulator further includes means responsive to a plurality of said comparison outcomes for changing the magnitude of said discrete amount.

6. The telephone answering machine of claim 5 wherein the magnitude of the discrete amount is changed at each sampling instant, said magnitude being increased in response to four consecutive comparisons having the same outcome, and decreased otherwise.

7. In a telephone answering machine including a magnetic tape for recording speech signals and non-permanent memory means for storing an outgoing announcement encoded in binary digital form, a method for providing delivery of the outgoing announcement including the steps of:
    recording the outgoing announcement exclusively on the magnetic tape;
    converting the outgoing announcement, stored on the magnetic tape, into an ordered set of binary digits, said converting being exclusively responsive to analog signals stored on the magnetic tape;
    storing the ordered set of binary digits in the non-permanent memory means; and
    converting the ordered set of binary digits stored in the non-permanent memory means into an analog signal for connection to a telephone line.

8. The method of claim 7 wherein the step of converting the outgoing announcement into an ordered set of binary digits includes the steps of:
    periodically comparing the instantaneous value of the outgoing announcement with an approximation voltage, the outcome of each comparison being a binary digit;
    increasing or decreasing the approximation voltage by a discrete amount in accordance with the state or the binary digit; and
    storing the binary digits in the non-permanent memory means in their order of creation.

9. The method of claim 8 further including the steps of:
    increasing the magnitude of said discrete amount in response to a plurality of consecutive binary digits having the same value; and
    decreasing the magnitude of said discrete amount when the plurality of consecutive binary digits do not have the same value.

10. In a microprocessor controlled telephone answering machine including: (i) a magnetic tape for receiving incoming messages from a telephone line, (ii) initialization commands stored in permanent memory associated with the microprocessor, and (iii) non-permanent memory means storing an outgoing announcement encoded in binary digital form, a method for initializing the telephone answering machine including the steps of:
    rewinding the magnetic tape to its beginning position from a rest position at the end of the region used for storing incoming messages;
    measuring the distance that the tape is rewound;
    storing said measures rewind distance as the location of the rest position;
    forwarding the magnetic tape a known distance to a region where an outgoing announcement is stored;

converting the outgoing announcement, stored on the magnetic tape, into an ordered set of binary digits, said converting samples the outgoing announcement at a rate inversely proportional to a stored measure of its duration;

storing the ordered set of binary digits in the non-permanent memory means; and forwarding the magnetic tape to its rest position.

11. In a telephone answering machine including random access memory means for storing an announcement in binary digital form; and digital-to-analog conversion means for converting the binary digital announcement, stored in the random access memory means, into an analog announcement signal for transmission over a telephone line, the improvement comprising:

means responsive to the initial recording of said analog announcement signal for storing said signals exclusively on a magnetic tape storage means; and analog-to-digital conversion means operative after the completion of said initial recording of said analog announcement signal, for converting said analog announcement stored on the magnetic tape, into a binary digital signal for storage in the random access memory means.

12. The telephone answering machine of claim 11 further including means for measuring the time duration of the analog announcement, stored on the magnetic tape, wherein the analog-to-digital conversion means includes:

means for sampling the analog announcement at a variable rate; and means for varying the sampling rate in inverse proportion to said measured time duration.

13. The telephone answering machine of claim 11 wherein the analog-to-digital conversion means includes a Delta Modulator comprising:

means for storing an approximation voltage, representative of the instantaneous value of the analog announcement;

means for periodically comparing the magnitude of the analog announcement with the magnitude of the approximation voltage; and means for increasing/decreasing the magnitude of the approximation voltage by a discrete amount in accordance with the outcome of said comparison.

14. The telephone answering machine of claim 13 wherein the magnitude of the discrete amount is changed at each sampling instant, said magnitude being increased in response to four consecutive comparisons having the same outcome, and decreased otherwise.

15. In a telephone answering machine, the combination of:

magnetic tape apparatus storing an analog signal, means for measuring the time duration of the analog signal stored on the magnetic tape, means for periodically sampling the magnitude of the analog signal at a predetermined rate;

means for converting the magnitude of said analog samples into one or more binary digits at each sampling instant;

means for varying said predetermined rate in inverse proportion to the measured time duration;

random access memory means storing the binary digits resulting from the analog-to-digital conversion; and digital-to-analog conversion means for converting the binary digits, stored in the random access memory, into a reconstructed analog signal for use as an outgoing announcement, said reconstructed analog signal being connected to a telephone line in response to an incoming telephone call.

16. In a telephone answering machine including a magnetic tape for storing a speech signal for transmission over a telephone line and for recording messages received over the telephone line, characterized by:

means for measuring the time duration of the speech signal stored on the magnetic tape;

analog-to-digital conversion means, having a variable sampling rate, for converting the speech signal stored on the magnetic tape into a binary digital signal;

means responsive to the measured time duration of the speech signal for varying the sampling rate of the analog-to-digital converter;

solid state storage means for storing said binary digital signal; and digital-to-analog conversion means for converting the stored binary digital signal into the speech signal for transmission over the telephone line.

* * * * *